INVENTOR
Georg Fritz
Dicke & Craig
BY
ATTORNEYS

March 29, 1966 G. FRITZ 3,242,732
LIQUID LEVEL INDICATOR APPARATUS
Filed March 16, 1964 4 Sheets-Sheet 3

INVENTOR
Georg Fritz
Dicke & Craig
BY
ATTORNEYS

March 29, 1966 G. FRITZ 3,242,732
LIQUID LEVEL INDICATOR APPARATUS
Filed March 16, 1964 4 Sheets-Sheet 4

INVENTOR
Georg Fritz
Dicke & Craig
BY
ATTORNEYS 3,242,732
LIQUID LEVEL INDICATOR APPARATUS
Georg Fritz, Reisenbergstrasse 55, Guglingen,
Wurttemberg, Germany
Filed Mar. 16, 1964, Ser. No. 352,108
Claims priority, application Germany, Mar. 21, 1963,
F 23,588; Mar. 29, 1963, F 23,633
13 Claims. (Cl. 73—302)

The present invention relates to a measuring device for indicating the contents of liquid containers, in which a pressure is produced within a measuring pipe dipping into the liquid column, which pressure is dependent on the liquid level and that there is provided a pressure measuring device with indicator and scale for measuring the pressure, a connection for the measuring pipe dipping into the liquid, and a hand-operated compressed air pump for pumping into the measuring pipe the amount of air required for the measuring operation, as well as a casing surrounding the measuring device, with scale and indicator, which is adapted for fastening to a vertical surface.

The invention is directed to the problem of providing such a measuring appliance with a casing which embodies an outer surface which is as smooth as possible and in which all the components are satisfactorily enclosed, without the installation, adjustment, or servicing of the appliance being thereby hindered. Moreover appliances according to the invention are adapted to be fastened as required either directly to the container or to a vertical wall surface. This arrangement makes it unnecessary to provide a special construction of the casing or a special construction and arrangement of the measuring element components provided therein.

The invention consists in the fact that the casing is provided with an easily removable cover member embodying a window for the scale, upon removal of which all the parts required for mounting or adjustment and calibration of the device, as well as for servicing thereof are easily accessible, and, so far as necessary, easily removable. Thus for example projections provided with spring tongues are fitted to the casing of the appliance, which engage in corresponding recesses in the cover and are adapted to be depressed from the outside for disengagement.

The cover can thus be removed even without the use of any tools in order to provide access for the parts underneath it, and thus offers satisfactory protection for the parts beneath it. The cover can be so constructed that angles and corners, upon which dirt and moisture can be deposited, are avoided to a large extent.

According to a preferred constructional example the casing of the appliance according to the invention consists of a rear wall with a frame fitted thereon for receiving the pump and the measuring elements. The frame thus extends at an appreciable distance from the outer edge of the base plate, while the cover extends up to this edge. The sections of the base plate lying outside of the frame are then provided with openings for fastening the apparatus to a vertical wall, and thus is readily accessible after removal of the cover. The pump and the measuring elements are then arranged within this frame which provides advantageously a particularly high degree of protection for the delicate measuring elements.

For this purpose the space surrounded by the frame can be closed by means of a further cover plate. An adjusting screw for setting the zero point of the appliance, as well as a sensitive regulating valve arranged in the head of the pump cylinder, projects through openings in the frame or in the cover plate and is easily accessible after removing the cover. It is of particular importance that guides are provided on the frame into which easily exchangeable scales can be inserted after removal of the cover. This has the advantage that inaccuracies in the measurement, which may be caused for example by aging of the diaphragm can be corrected, without dismounting the appliance, by inserting a new scale. Moreover, the measuring appliance can be utilised for containers of different sizes, by inserting an appropriate scale and without modifying the arrangement of the equipment. Thus the base plate, frame and cover constitute housing means.

Further details and features of the invention will be apparent from the following description in which the invention is explained and described with reference to the constructional examples shown on the accompanying drawing and in which.

Figure 1:
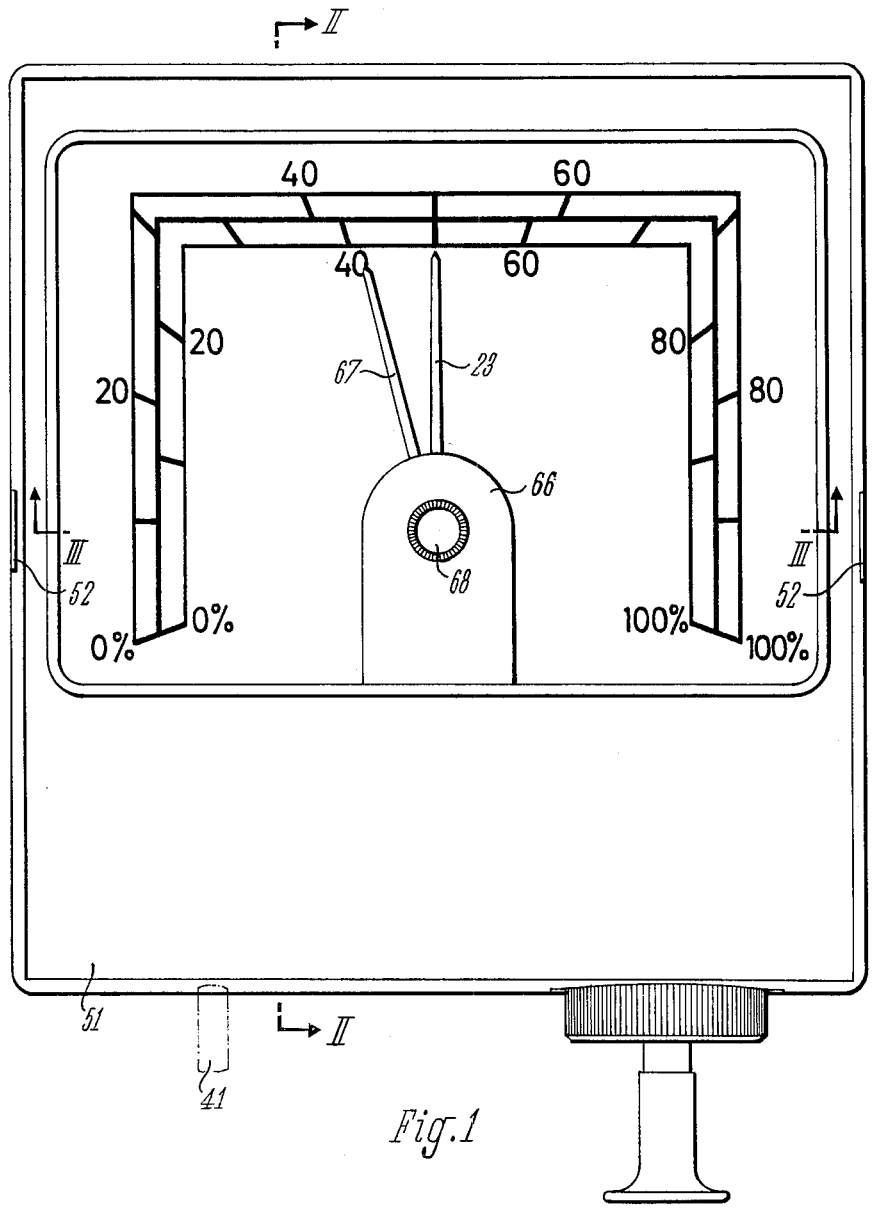
FIG. 1 shows a front view of apparatus according to the invention.
Figure 2:
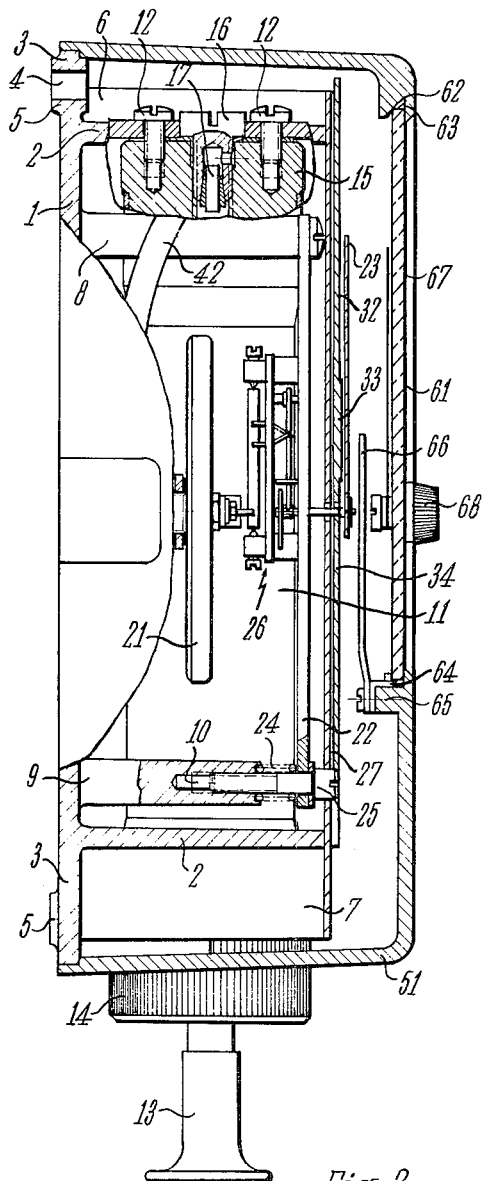
FIG. 2 shows a section on the line II—II.
Figure 3:
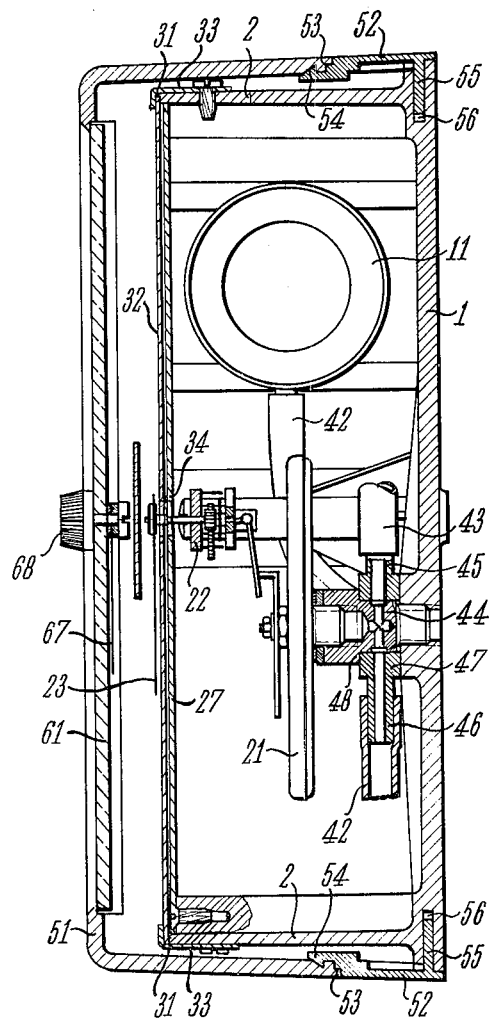
FIG. 3 is a section on the line III—III through the measuring appliance shown in FIG. 1.

The measuring appliance shown in FIGS. 1 to 3 is essentially fitted within a casing, which consists of a substantial rear wall 1 and a frame 2 fitted thereto. The frame 2 extends at some distance from the outer edges of the base plate 1. Apertures 4 for fastening the appliance to a vertical wall are provided in the portions 3 of the base plate 1 lying outside of the frame. At the points where these apertures are provided the base plate embodies thickened portions 5. The upper part of the frame 2 is provided with a depression 6 in the region of the aperture 4 (FIG. 2).

Within the frame 2 are provided the pump cylinder 11 and the measuring elements, which consists of a barometric capsule 21 and a drive member mounted on a stem 22 for transmitting the linear movement of the diaphragm of the capsule into a rotary movement of the indicator 23. The pump cylinder 11 is arranged with the end face of its head against the inner wall of the stem 2 and is fastened at this point by means of two screws 12. Its other end, from which the operating knob 13 projects, extends through the frame which embodies at this point a box-like projection 7 and is fastened at this point by means of a knurled nut 14.

A regulating valve 17 is arranged in the head 15 of the pump cylinder 11 within a hollow screw 16, which ensures that the air from the pump cylinder 11 can flow without sudden surges into the capsule 21, and into a measuring pipe communicating therewith. The head of the hollow screw 16 enters an opening in the frame 2 and is consequently easily accessible from the outside. Exchange of the regulating valve or removal for cleaning thus involves no difficulties.

The stem 22 in which the drive mechanism co-operating with the capsule 21 is mounted, is firmly screwed at its upper end (FIG. 2) to the end of a column 8 arranged within the space surrounded by the frame 2. The other end of the stem 22 is pressed against the head of an adjusting screw 25 by means of a coil compression spring 24 which rests at one end against the end of a further column 9 and at the other end against the stem 22. The adjusting screw 25 is screwed into a threaded bore 10 which is located in the column 9. The coil spring 24 is thus carried by the shank of the adjusting screw 25. By rotating the latter the corresponding end of the stem or blade 22 is brought more or less near the end of the column 9. Correspondingly also the measuring unit 26 supported on the stem or blade 22 is brought closer to or further from the capsule 21. Since the spacing between the surface of the capsule 21 facing the measuring unit, in the form of a diaphragm, and said unit 26 itself is vulnerable, the movement of the pointer is thereby determined and thus by adjusting the screw 25 the zero position of the indicator can be corrected. The head of the adjusting screw 25 passes through a cover plate 27 which closes the space defined by the frame member 2, and consequently is easily accessible from the outside.

As will be seen from FIGS. 2 and 3 the cover plate lies against the forward end faces of the upper and lower sections of the frame 2 and the outer surfaces of these parts are flush, while the lateral parts of the frame 2 extend somewhat higher and project somewhat to provide guides for the plate 27. The projecting edges of the lateral parts of the frame 2 moreover embody step-like guides 31 for a special scale 32 which is held in the guides by means of clamps 33 screwed externally into the frame 2, which overlie the edges of the frame. The scale 32 can be simply inserted from above into the guides 31. It embodies for this purpose a slot 34 running parallel to the guides, which extends from its lower edge up to about its middle and permits entry of the shaft carrying the indicator 23. The scale 32 is thus easily interchangeable so that according to the shape of the container, the contents of which are to be measured by means of the appliance, a suitable scale can be inserted in each case, while the cover plate 27 may also embody a generally applicable scale also, as is indicated in FIG. 1. It would even be possible to insert from time to time a corrected scale in an already mounted measuring appliance in order to take account of any possible ageing effects.

The connection between the head 15 of the pump cylinder 11 and the capsule as well as between the latter and the measuring pipe 41 indicated in FIG. 1, is obtained by means of tubes 42 and 43. Since the responder element fed by the pipe 41, and responding to changes in the liquid level, follows normal practice in this art, it has not been judged necessary to show the manner in which this pipe receives changes in air pressure due to changes in the liquid level. Hose connections are provided for engagement with the pipes 42 and 43 on the pump cylinder 11 and also on the connecting member for the outlet pipe. Also the barometric capsule 21 is fastened to a distributor block 44 screwed into the rear casing wall 1 and provided with tube connections 45 and 46, the pipe 43 connecting pipe 41 with the distributor block. These tube connections are fitted to a ring-shaped member 47 formed in one piece therewith, and which is clamped against the rear casing wall 1 between a shoulder 48 on the distributor 44 and a projection on the wall 1. The ring 47 with the connections 4 and 5 consists of a material which is sufficiently resilient to provide a fluid-tight fit against the pipe connections. A suitable material for this purpose is for example plasticised polyvinyl chloride.

The base plate 1 with the frame 2 of the casing and the parts of the appliance fastened thereto, are covered by means of a protective cover 51 which extends up to the edge of the base plate 1 and overlaps it. In order that the fastening holes lying behind the cover, the interchangeable scale 32, the adjusting screw 25 for adjusting the indicator and the hollow screw 16 with the nozzle 17 for assembly and servicing the appliance, can be made easily accessible, the cover is so constructed and fastened that it can be readily released without using any tools. For this purpose spring tongues 52 are fitted to the base plate 1 of the casing, which extend aprroximately perpendicularly to the base plate 1 in the direction of the lateral casing walls. The tongues 52 embody at their edge a stepped profile 53 engaged by the edge of a corresponding opening in the side wall of the cover 51. The outer surfaces of the tongues 52 are flush with the outer surfaces of the cover walls when the cover is inserted in position. Catch portions 54 are located in the ends of the tongues 52 which engage corresponding depressions in the inner surfaces of the side walls of the cover 51. The tongues themselves embody at their rear ends projections 55 extending in the direction of the base plate 1, which are inserted in corresponding slots 56 in the latter and are for example firmly stuck in position by suitable adhesive. The tongues 52 together with their projections 55 consist of resilient material, for example a resilient synthetic material, so that their catch portions 54 are adapted to latch correctly into the corresponding recesses in the cover 51, to retain the latter firmly in position. For the purpose of removing the cover it is sufficient to force the tongues on the opposed side of the appliance inwardly to a slight extent, after which the cover can be easily removed.

The cover 51 is provided with a recess for a window 61 and at the upper edge of this recess there is located an inclined groove 62 in which a rubber packing 63 is inserted. The window 61 engages this groove by one edge and seats against the packing 63. At the opposite edge the window 61 is fastened by means of a holder 64 fastened to a rib 65 of the hood. A plate 66 together with the holder 64, is fastened to the rib 65, which extends from the bottom edge of the window to a height above the axis of the indicator 23 and conceals a slot 34 in the scale 32. A reference marker 67 is supported in line with the axis of the indicator 23 on the window 61, which is rotatable by means of a button 68 lying on the outer side of the window 61. The indicator can for example be adjusted to a previous measurement value so that at the next measurement the consumption can be read from the difference between the marker indicator 67 and the measurement indicator 23.

Figure 4:
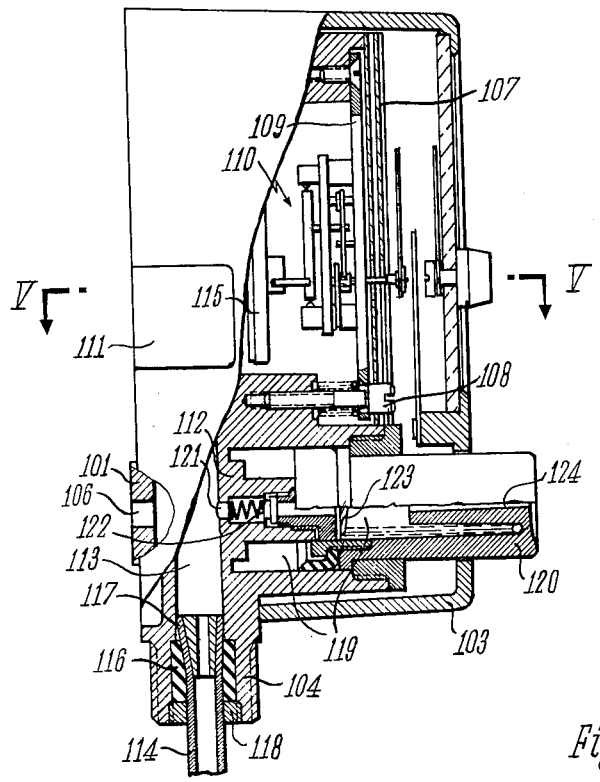
FIG. 4 shows a further appliance according to the invention partially in section along the line IV—IV in FIG. 5.
Figure 5:
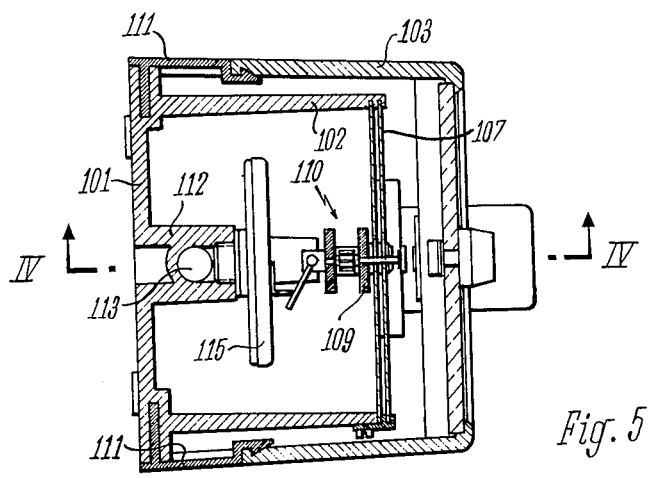
FIG. 5 is a section along the line V—V through the appliance according to FIG. 4.

FIGS. 4 and 5 show a further appliance according to the invention which has the characteristics of being of particularly small dimensions and also suitable for fitting directly to small containers. For this purpose the appliance casing, which again consists of the base plate 101 with the frame 102 and the cover 103, embodies at the lower edge of the base plate and the under side of the frame a connecting member 104 which is provided with an external thread and permits the appliance to be screwed on to the container, the contents of which are to be measured. However in this embodiment openings 106 are also provided in the base plate 101 which permits the appliance to be fastened to a vertical wall. These apertures 106 are accessible after removing the cover 103, just like the interchangeable scale 107, and the adjusting screw 108 for adjusting the measuring elements 110 fastened to the stem or blade 109, the cover 103 being held by the resilient tongues 111 in the manner above described.

The apparatus of FIGS. 4 and 5 differs however from that of FIGS. 1 to 3 by the fact that a vertical duct 113 extends through a block portion 112 moulded in the rear wall 101 and extends from the connecting member 104 in line with the latter, and continues the measuring pipe 114 up to the barometric capsule 115, which latter is screwed into the block 112 as shown in FIG. 5, and is in communication with the duct 113. In the region of the connecting member 104 the duct 113 is of stepped shape and serves for receiving the sealing member 116 which surrounds the measuring pipe 114, which in turn is provided at its end with a conical insert 117 and is of enlarged form. The sealing member 116 is forced firmly against the progressively enlarging outer wall of the pipe 114 by means of a threaded ring 117 screwing into a corresponding screw-threaded bore of the connecting member 104, so that a good sealing of this pipe is obtained.

The block 112 embodying the duct 113 furthermore includes a bore 119 which serves as a pump cylinder in which the piston 120 is guided. The pump formed by the bore 119 and the piston 120 extends perpendicularly to the duct 113. The piston 120 projects through an opening in the cover 103 and projects forwardly out of it so that the pump can be readily operated by thumb pressure on the end of the piston 120. The pump chamber 119 is in communication with the duct 113 through a bore 121, a non-return valve 122 being arranged in the duct 113. This valve hinders loss of air from the measuring pipe or from the duct 113 when the piston 120 is allowed to return to the rest position shown in the drawings under the action of a coil spring 123. A bore 124 provided in the piston 120 permits entry of air into the pump cylinder 119, and is closed by the finger when operating the pump.

It should be understood that the invention is not limited to the constructional examples shown, but that changes therefrom are possible without departing from the scope of the invention. Such changes may follow from the fact that in certain embodiments of the invention only certain of the characteristic features may be used, and these features may be used individually or several of them may be combined in one embodiment of the invention.

What I claim is:

1. A liquid level indicator apparatus in which a pipe dips into the liquid to generate a gaseous fluid pressure dependent on the liquid level, comprising a measuring unit including a pressure responsive device, a scale member, an indicator elements actuated by said device, said element being movable across said scale member to register pressure representing the liquid level, an adjusting screw for adjusting the zero position of said element, connecting means to transmit pressure to said device from said pipe, a manually-operated fluid pump for feeding gaseous fluid into said pipe, housing means for said pump, said pressure responsive device, said scale member, said indicator element and said adjusting screw, said housing means comprising a base plate, a frame supported on said base plate, said frame supporting said fluid pump and said pressure-responsive device, said frame being displaced inwardly from the outer edges of said base plate for a substantial distance to define marginal portions of said base plate, said housing means further comprising a readily removable cover having a window therein facilitating a view of said scale member, said cover having edge portions in contact with said outer edges of said base plate, apertures in said marginal portions of said base plate adapted for fastening said apparatus to a vertical wall, said apertures and said adjusting screw being accessible upon removal of said cover.

2. A liquid level indicator apparatus according to claim 1, wherein said frame comprises two opposed edge portions, guide means in said edge portions, said scale member being slidably received in said guide means.

3. A liquid level indicator apparatus according to claim 2, wherein slot means for guiding said scale member into said guide means are provided in said frame.

4. A liquid level indicator apparatus according to claim 3, wherein clamp members are secured to said frame and overlap said edge portions.

5. A liquid level indicator apparatus according to claim 2, wherein said scale member is provided with slot means extending lengthwise parallel to said guides means, said indicator element being supported by a shaft, said slot means being adapted to receive said shaft.

6. A liquid level indicator apparatus according to claim 1, wherein said measuring unit is disposed within said frame, a stem member having one end secured to said frame member and the other end engaging said adjusting screw, and a helical spring engaging said other end and pressing the latter against the head of said adjusting screw.

7. A liquid level indicator apparatus according to claim 6, said frame defining a space and housing an opening on one side, a cover plate for said frame, said cover plate closing said opening and having a aperture receiving said adjusting screw.

8. A liquid level indicator apparatus according to claim 1, wherein said pump comprises a pump cylinder, the head of said pump cylinder being provided with a regulating valve, a hollow screw threadedly engaged with said head and enclosing said regulating valve, said screw being readily accessible upon removal of said cover.

9. A liquid level indicator apparatus according to claim 8, wherein said frame is hollow, said pump cylinder being disposed within said frame, said frame being provided with a further opening, said hollow screw protruding into said further opening.

10. A liquid level indicator apparatus according to claim 8, further including fluid connections between said pump cylinder and said pipe, said fluid connections comprising tube members, a distributor block provided with two tube connections, a ring-shaped plastic member secured to said base plate and engaging said distributor block, said tube connections being fitted to said ring-shaped member and communicating with said tube members.

11. A liquid level indicator apparatus according to claim 8, wherein said base plate comprises a block portion having a duct portion therein and a bore connecting said duct portion with said pump cylinder.

12. A liquid level indicator apparatus according to claim 1, wherein said outer edges of said base plate comprise two opposite edges, spring tongues extending approximately perpendicularly from said opposite edges, said tongues having outer surfaces, said cover having side walls, said outer surfaces being aligned with the outer surfaces of said side walls prior to removal of said cover, said side walls having depressions in the inner surfaces thereof, said tongues comprising catch portions at end portions thereof, said catch portions being engageable in said recesses.

13. A liquid level indicator apparatus according to claim 12, wherein said tongues are formed of resilient synthetic material and comprise projections at other end portions thereof, said base plate being provided with slots, and said projections being received in said slots.

References Cited by the Examiner

UNITED STATES PATENTS

| | | | |
|---|---|---|---|
| 1,656,262 | 1/1928 | Batchelder | 73—302 X |
| 1,711,507 | 5/1929 | Titterington | 73—302 |
| 2,001,853 | 5/1935 | Seward | 73—302 |
| 2,123,532 | 7/1938 | Hastings | 73—431 X |
| 2,309,211 | 1/1943 | Raphael | 73—431 |
| 2,722,837 | 11/1955 | Dwyer | 73—431 X |
| 2,796,764 | 6/1957 | Gulich | 73—302 |
| 2,866,940 | 12/1958 | Lamb | 73—431 X |

LOUIS R. PRINCE, *Primary Examiner.*

FRANK H. THOMSON, *Assistant Examiner.*